(12) United States Patent
Schepperle et al.

(10) Patent No.: US 10,871,203 B2
(45) Date of Patent: Dec. 22, 2020

(54) TRANSMISSION FOR A MOTOR VEHICLE (71) Applicant: ZF Friedrichshafen AG, Friedrichshafen (DE)

(72) Inventors: Bernd Schepperle, Constance (DE); Michael Preuβ, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 1034 days.

(21) Appl. No.: 15/310,141

(22) PCT Filed: Apr. 27, 2015

(86) PCT No.: PCT/EP2015/059003
§ 371 (c)(1),
(2) Date: Nov. 10, 2016

(87) PCT Pub. No.: WO2015/180903
PCT Pub. Date: Dec. 3, 2015

(65) Prior Publication Data
US 2017/0152916 A1     Jun. 1, 2017

(30) Foreign Application Priority Data
May 26, 2014   (DE) ........................ 10 2014 209 970

(51) Int. Cl.
*F16H 3/093*     (2006.01)
*F16H 61/688*    (2006.01)
(Continued)

(52) U.S. Cl.
CPC ............. *F16H 3/093* (2013.01); *F16H 3/006* (2013.01); *F16H 3/0915* (2013.01);
(Continued)

(58) Field of Classification Search
CPC ........ F16H 3/006; F16H 3/093; F16H 3/0915; F16H 61/688
(Continued)

(56) References Cited

U.S. PATENT DOCUMENTS 2,991,661 A  *  7/1961  Rambausek  ..........  F16H 3/0915
                                                  74/330
3,691,861 A  *  9/1972  Sturmer  ..................  F16H 3/006
                                                  74/330
(Continued)

FOREIGN PATENT DOCUMENTS

DE    31 31 156 A1    2/1983
DE    41 22 628 A1    1/1993
(Continued)

OTHER PUBLICATIONS

German Search Report Corresponding to 10 2014 209 970.6 dated Oct. 8, 2015.
(Continued)

*Primary Examiner* — William C Joyce
(74) *Attorney, Agent, or Firm* — Davis & Bujold PLLC; Michael J. Bujold (57) ABSTRACT

A dual clutch transmission for a motor vehicle including two sub-transmissions, each having at least one input shaft. An output shaft outputs drive from both sub-transmissions. The input shafts are arranged on an input shaft axis and the output shaft is arranged on the input shaft axis or a parallel countershaft axis. An intermediate gear system includes at least one countershaft which is arranged on the countershaft axis. At least four shifting elements are arranged such that, in each case, at least two shifting elements are arranged on the input shaft axis and on the countershaft axis. At least one input shaft can be connected to the output shaft by way of two wheel planes and/or at least one shifting element. Preferably half of the shifting elements are unsynchronized (Continued)

and at least one-third of the shifting elements are synchronized. Also a method for operating a dual clutch transmission.

15 Claims, 2 Drawing Sheets

(51) Int. Cl.
   *F16H 3/00* (2006.01)
   *F16H 3/091* (2006.01)
   *F16H 3/08* (2006.01)
   *F16H 61/04* (2006.01)

(52) U.S. Cl.
   CPC ... *F16H 61/688* (2013.01); *F16H 2003/0807* (2013.01); *F16H 2003/0811* (2013.01); *F16H 2003/0933* (2013.01); *F16H 2061/0407* (2013.01); *F16H 2061/0429* (2013.01); *F16H 2200/0052* (2013.01); *F16H 2200/0086* (2013.01)

(58) Field of Classification Search
   USPC .......................................................... 74/330
   See application file for complete search history.

(56) References Cited

U.S. PATENT DOCUMENTS

| | | | |
|---|---|---|---|
| 8,066,606 B2 * | 11/2011 | Dittrich | F16H 3/006 475/218 |
| 8,485,055 B2 | 7/2013 | Gumpoltsberger et al. | |
| 9,541,180 B2 * | 1/2017 | Kaltenbach | F16H 37/065 |
| 2011/0251011 A1 * | 10/2011 | Holmes | B60K 6/405 475/198 |
| 2013/0133450 A1 * | 5/2013 | Hedman | F16H 3/006 74/330 |
| 2014/0013881 A1 | 1/2014 | Luebke et al. | |

FOREIGN PATENT DOCUMENTS

| | | |
|---|---|---|
| DE | 10 2006 007 010 A1 | 8/2007 |
| DE | 10 2006 054 281 A1 | 6/2008 |
| GB | 2 103 317 B | 2/1983 |
| WO | 2010/015748 A1 | 2/2010 |
| WO | 2012/126663 A1 | 9/2012 |

OTHER PUBLICATIONS

International Search Report Corresponding to PCT/EP2015/059003 dated Jul. 21, 2015.
Written Opinion Corresponding to PCT/EP2015/059003 dated Jul. 21, 2015.

* cited by examiner

TRANSMISSION FOR A MOTOR VEHICLE

This application is a National Stage completion of PCT/EP2015/059003 filed Apr. 27, 2015, which claims priority from German application serial no. 10 2014 209 970.6 filed May 26, 2014.

FIELD OF THE INVENTION

The invention concerns a transmission, in particular a dual clutch transmission for a motor vehicle, comprising at least two sub-transmissions, each of the sub-transmissions having at least one input shaft, and wherein an output shaft is arranged as the drive output shaft of both of the sub-transmissions, wherein the at least one input shaft is arranged on an input shaft axis and the drive output shaft is arranged on the input shaft axis or on a countershaft axis, particularly a countershaft axis that is parallel to the input shaft axis, and wherein an intermediate gear system with at least one countershaft is arranged with the at least one countershaft on the countershaft axis, the transmission comprising at least four shifting elements such that respectively at least two shifting elements are arranged on the input shaft axis and on the countershaft axis, and wherein at least one of the input shafts can be connected to the drive output shaft by means of at least two wheel planes and/or at least one shifting element.

The invention also concerns a method for operating a dual clutch transmission.

BACKGROUND OF THE INVENTION

Such transmissions for a motor vehicle are, among other things, designed as so-termed dual clutch transmissions, in which the input shafts of the two sub-transmissions can be connected to a drive input, for example an internal combustion engine or an electric motor, each by way of a respective powershift element, such that the two powershift elements are combined in the form of a dual clutch. The gear steps that can be obtained by means of such a transmission are then divided in alternation between the two sub-transmissions, so that for example one sub-transmission produces the odd-numbered gears and the corresponding other sub-transmission produces the even-numbered gears. It is also known to obtain the individual gear steps by means of one or more wheel stages or wheel planes, each of which gives a different transmission ratio. By means of corresponding shifting elements, these can be connected into the force or torque flow between the drive input and the drive output, so that a corresponding desired gear ratio is obtained in each case between the drive input and the drive output.

By dividing the gears between the two sub-transmissions in alternation, it is possible when driving in a gear associated with one of the sub-transmissions to preselect a next gear in the respective other sub-transmission by appropriate actuation of the shifting elements, so that an eventual shift to the next gear is enabled by opening the powershift element of the first sub-transmission and, shortly after, closing the powershift element of the other sub-transmission. In this way the gears or gear steps of the transmission can be shifted under load, which improves the accelerating ability of the motor vehicle since the gearshift is then essentially carried out without traction load interruption, and shifting processes are made more comfortable for a vehicle driver.

In this context such dual clutch transmissions can also be made with an intermediate gear system in addition to the drive input and drive output, so that a more compact structure in the axial direction is produced.

From DE 10 2006 054 281 A1 a transmission of this type for a motor vehicle, in the form of a dual clutch transmission, has become known. The dual clutch transmission comprises two sub-transmissions, each with an input shaft. By connecting the respective input shafts by way of a powershift element in each case, the two sub-transmissions can each be connected in alternation into a force or torque flow from a drive input to a drive output; in this case the input shaft of the first sub-transmission is in the form of a central transmission shaft and the input shaft of the second sub-transmission is a hollow transmission shaft. Furthermore, an output shaft is arranged so as to be the drive output of both sub-transmissions and rotational movement of the drive input can be transmitted via a number of gear ratio steps to the drive output, the force and torque flow passing by way of an intermediate gear system. In this case at least two wheel planes are engaged in the force and torque flow by actuating associated shifting elements, so that by a combination of the actuation of the shifting elements and the force and torque flow via corresponding wheel planes a number of gear ratios can be obtained. Likewise, the rotational movement of the drive input can be transmitted to an output shaft of the drive output without any gear ratio by actuating appropriate shifting elements.

Figure 1:
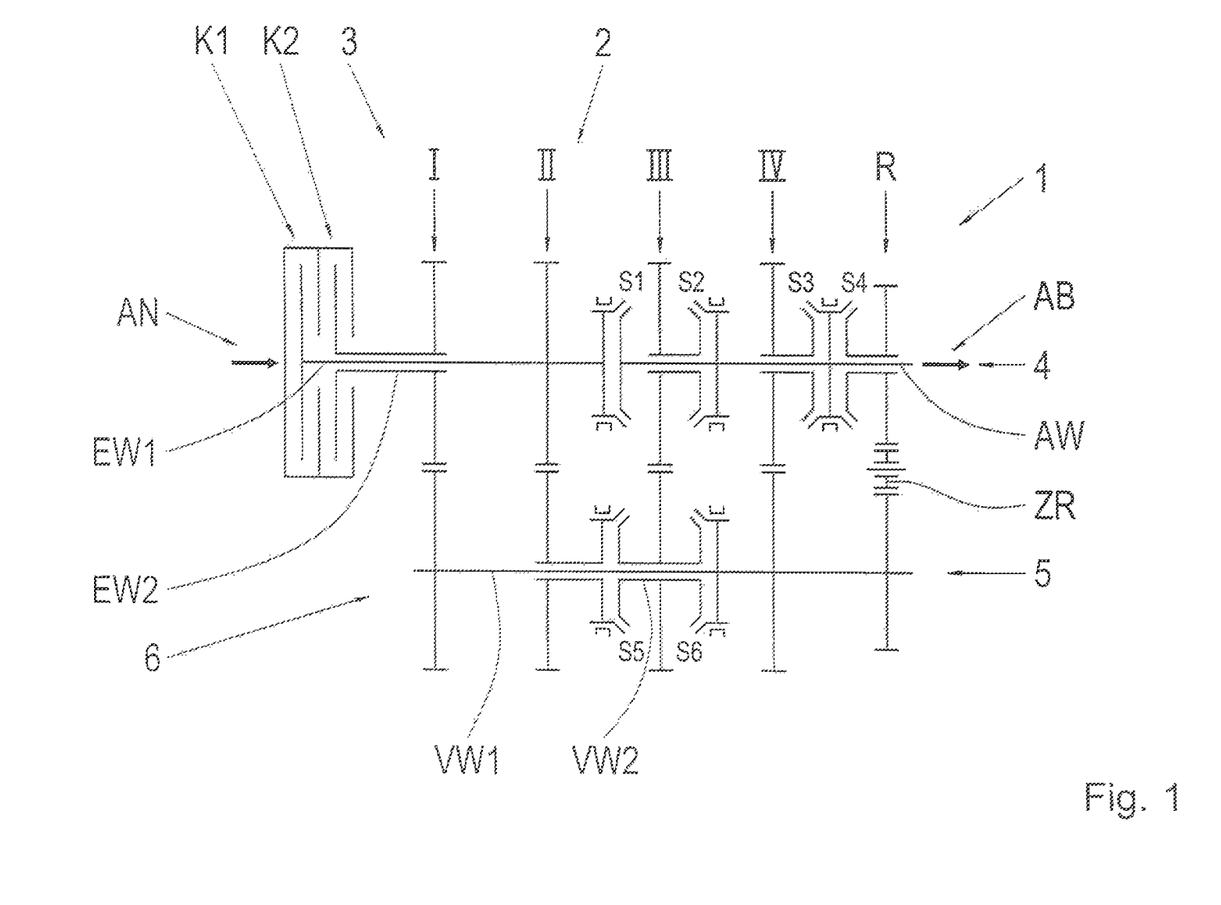
FIG. 1: A transmission according to a first embodiment of the present invention.
Figure 2:
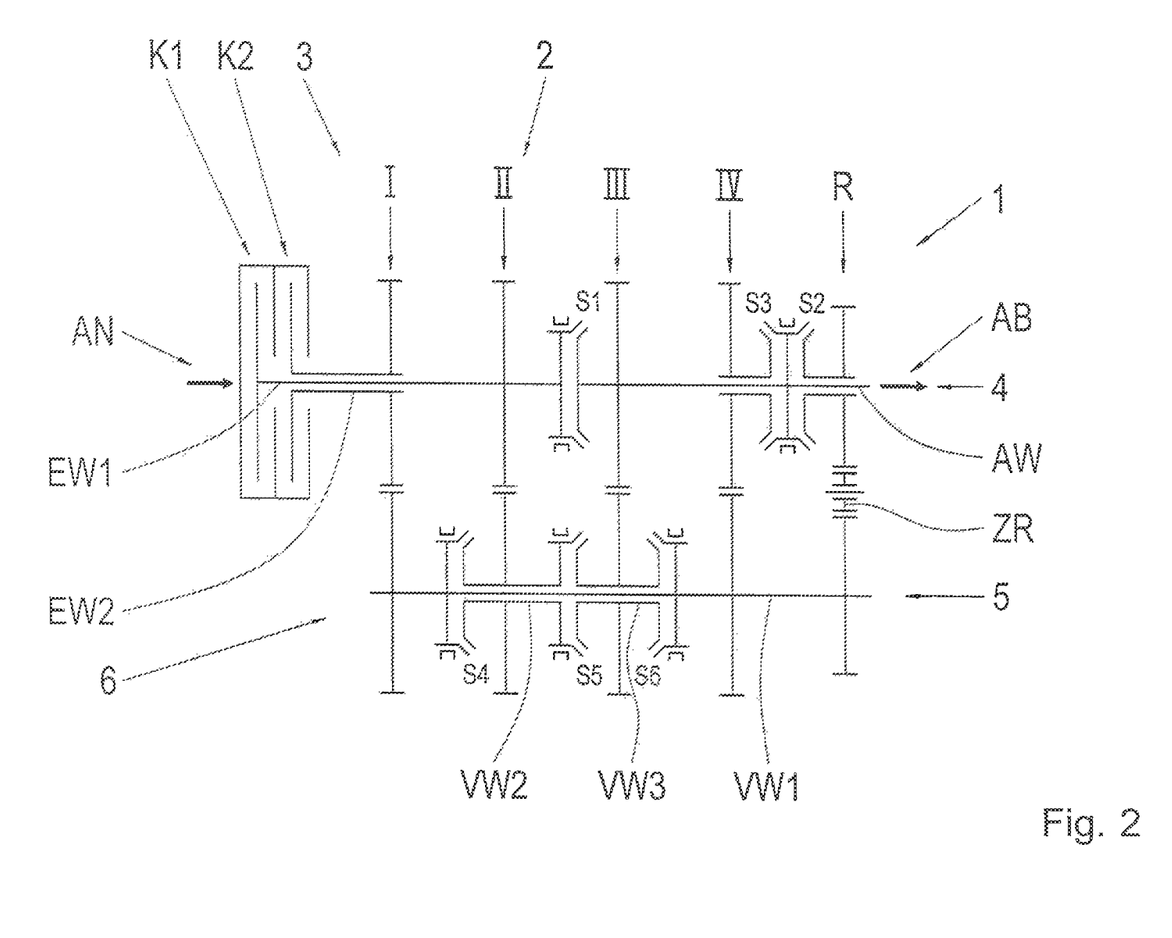
FIG. 2: A transmission according to a second embodiment of the present invention.

Moreover, six-gear dual clutch transmissions with a structure according to the schematic representations shown in FIGS. 1 and 2 have become known. Such a transmission comprises a total of five wheel planes, one of which is designed as a reversing gear stage. In addition, to couple the wheel planes or shafts six shifting elements or shifting points are arrange in the transmission, which are in the form of synchronizers with friction clutches. Likewise, central synchronizers can also be used.

A disadvantage of this, among others, is that in the known dual clutch transmissions the shifting elements are complicated to manufacture and are therefore expensive. A further disadvantage is that they take up a lot of structural space.

SUMMARY OF THE INVENTION

One objective of the present invention is therefore to provide a transmission which is compact and simple to produce and operate, and a method for operating a transmission. A further objective of the present invention is to indicate an alternative transmission and an alternative method for operating a transmission.

The present invention achieves these objectives with a transmission, in particular a dual clutch transmission for a motor vehicle, which comprises at least two sub-transmissions each of which has at least one input shaft, and wherein an output shaft is arranged as the drive output shaft of both sub-transmissions, such that the at least one input shaft is arranged on an input shaft axis and the drive output shaft is arranged on the input shaft axis or on a countershaft axis, in particular a countershaft axis arranged parallel to the input shaft axis, and wherein an intermediate gear system having at least one countershaft is arranged, the at least one countershaft being arranged on the countershaft axis, and wherein in each case at least four shifting elements are provided, such that at least two shifting elements are arranged on the input shaft axis and on the countershaft axis, and wherein at least one of the input shafts can be connected to the drive output shaft by means of at least two wheel planes and/or at least one shifting element, in that at least two and in particular three, preferably at least half of the at least four shifting elements are of unsynchronized design and at least two, in particular at least a third of the at least four shifting elements are of synchronized design.

The present invention also achieves the objectives by virtue of a method for operating a transmission as described below, such that for at least one change between two gears that can be obtained in the transmission by briefly operating one of the two clutches, a rotational speed of a shaft of whichever is the passive power branch of the transmission (an active power branch being that which—to obtain one of the two gears—is connected to a drive input whereas the passive power path is that which is not acted upon by force and torque from the drive input) is adapted in such manner that either a synchronized shifting element, in particular in the form of a friction clutch, is assisted or a transmission element in the sense of a loose wheel of an unsynchronized shifting element, in particular in the form of a claw clutch, can essentially be brought to the same rotational speed as a transmission element to be coupled, so that the unsynchronized shifting element can be shifted substantially with no rotational speed difference for the change to another gear.

Furthermore, the present invention achieves the objectives by virtue of a motor vehicle having a transmission as described below.

Finally, the present invention also achieves the objectives by virtue of a method for operating a transmission as claimed, in that for a gearshift between two gears the method as described below and claimed is used, at least in part.

One of the advantages achieved thereby is that the use of unsynchronized shifting elements, which can be manufactured more cheaply, enables the manufacturing costs of the transmission as a whole to be reduced considerably. A further advantage is that the radial fitting space occupied by the respective shifting elements or shifting points is substantially smaller. Accordingly the transmission can be made more compact in the radial direction. Finally, a further advantage is that the transmission can be made simply and inexpensively, and can be operated just as well.

Particularly preferably torque, for example from an internal combustion engine, can be applied to the transmission by way of the drive input shaft of the transmission or rotational movement of a drive input shaft. Preferably, between the drive input shaft and the drive output shaft, for example, of the internal combustion engine, there is a starting element such as a hydrodynamic torque converter or a hydraulic clutch or a friction clutch.

In what follows, a shaft is not exclusively to be understood as a—for example—cylindrical machine element mounted so as to rotate in order to transmit torques, but rather, the term also includes connecting elements that connect individual components or elements to one another, in particular connecting elements that connect a number of elements to one another in a rotationally fixed manner.

Two elements are in particular said to be connected to one another when there exists between the elements a solid, in particular rotationally fixed connection. In particular, such connected elements rotate at the same speed.

Furthermore, two elements are said to be able to be coupled or connected when between the elements there exists a releasable connection means. In particular, such elements rotate at the same speed when the connection has been formed.

The various components and elements of the invention can be connected to one another by a shaft or a connecting element, but also directly, for example by a weld, a press fir or some other connection.

In the description and especially in the claims a clutch is understood to be a shifting element which, depending on its state of actuation, allows a relative movement between two components or forms a connection for the transmission of torque. Relative movement is for example understood to mean rotation of two components such that the rotational speed of the first component and the rotational speed of the second component are different from one another. Moreover, it is conceivable that only one of the two components rotates while the other component stays still or rotates in the opposite direction.

In what follows an inactivated clutch is understood to mean an open clutch. This means that a relative movement between the two components is possible. When the clutch is actuated or closed, the two components correspondingly rotate at the same speed in the same direction.

Basically, it is also possible to use shifting elements which are closed in the inactivated state and open when actuated. Accordingly, the correlation between the function and the shifting condition of the above-described shifting states is understood to have been reversed. The example embodiments described below with reference to the figures are based, first, on an arrangement in which an actuated shifting element is closed and an inactivated shifting element is open.

A planetary gearset or planetary transmission comprises a sun gear, a planetary carrier or web and a ring gear. On the planetary carrier or web are planetary gearwheels or planetaries that mesh with the teeth of the sun gear and/or the teeth of the ring gear.

Furthermore, the shifting elements can be designed such that to change the shift condition of the shifting element energy is needed, but not to maintain the shift condition itself.

Particularly suitable for this are shifting elements that can be actuated according to need, such as elecromechanical shifting elements or electromagnetic shifting elements. Compared with conventional, hydraulically actuated shifting elements, these are noted for particularly low and efficient energy demand, since they can be operated almost free from loss. Moreover, advantageously there is no need to maintain permanently a control pressure for the actuation of the—for example—conventional hydraulic shifting elements, or to act upon the shifting element concerned in its shifted state permanently with the necessary hydraulic pressure. Because of this, for example further components such as a hydraulic pump can be dispensed with provided that such components serve exclusively for controlling and supplying the conventional, hydraulically actuated shifting elements. If other components are supplied with lubricant not by a separate lubricant pump but by the same hydraulic pump, then at least this can be made smaller. Also, possibly occurring leaks at oil transfer points of the hydraulic circuit, particularly in the case of rotating components, no longer take place. Particularly preferably, this also contributes toward increasing the efficacy of the transmission by boosting its efficiency.

When using shifting elements actuated according to need, of the types mentioned above, it is particularly advantageous for these to be easily accessible from the outside. Among other things this also has the advantage that the shifting energy required can be supplied to the shifting elements more conveniently. Accordingly it is greatly preferred to arrange shifting elements so that they can be accessed easily from outside. Easily accessible from the outside means, in the context of shifting elements, that no further components are arranged between the transmission housing and the shifting element, or that the shifting elements are arranged particularly preferably on the drive input shaft or on the drive output shaft.

In the description and particularly in the claims, the term "connectability" is preferably understood to mean that even with different geometrical positioning the same connection or linking of interfaces is ensured, with no crossing of individual connecting elements or shafts.

Further advantageous embodiments, features and advantages of the invention are also described below.

Expediently, the number of shifting elements is even and the numbers of unsynchronized and synchronized shifting elements are the same. This enables the radial space occupied by the transmission to be reduced and at the same time facilitates production, without having to abandon the use of synchronized shifting elements.

Advantageously, most of the unsynchronized shifting elements are arranged on the input shaft axis. This enables particularly inexpensive production of the transmission in the area of the input shaft axis.

Expediently, at least five wheel planes are provided, in particular with at least one wheel plane as a reversing gear stage. In this way a sufficient number of forward and reversing gears can be obtained in the transmission, so that the flexibility of the transmission with regard to its use in a variety of vehicles is increased.

Advantageously, most of the unsynchronized shifting elements cooperate with a wheel plane downstream in the torque direction from the shifting element concerned. Since therefore the wheel plane is in each case 'torque-downstream' from the unsynchronized shifting element, the transmission is simple to produce, and, at the same time, the structural space torque-upstream from the wheel plane is as small as possible by virtue of the arrangement of the unsynchronized shifting element.

Expediently, the shifting element most closely adjacent to the drive output side is made unsynchronized, particularly respectively on the input shaft axis and the countershaft axis. In this way the radial space occupied in the area of the drive output side can be made smaller.

Advantageously, a shifting element for actuating the reversing gear stage is of unsynchronized design. This enables simple and inexpensive production of the shifting element for the reversing gear stage.

Expediently, the wheel plane most closely adjacent to the drive output side is made as the reversing gear stage. In this way a large number of reversing gears can be obtained by connecting the reversing gear stage and one or more wheel planes torque-upstream from the reversing gear stage.

Advantageously, the unsynchronized shifting elements are in the form of claw clutches. This enables the unsynchronized shifting elements to be made particularly simply and inexpensively.

Expediently, by means of a shifting element two solid shafts on the input shaft axis can be coupled, particularly when the shifting element is in the form of an unsynchronized shifting element. In this way, for example, a direct gear can be obtained by way of one of the input shafts and the drive output shaft. If the shifting element that, for example, connects the input shaft and the drive output shaft when actuated, is an unsynchronized shifting element, the direct gear can be obtained particularly easily and inexpensively.

Advantageously, one of the wheel planes can be coupled by means of a synchronized shifting element to a solid shaft and by means of a further, unsynchronized shifting element to a transmission element which is a loose wheel of another wheel plane, in particular such that the two unsynchronized shifting elements are arranged in the intermediate gear system. This increases the flexibility of the transmission in relation to the engagement of a variety of gears, while at the same time not only the radial space occupied but also the axial space are reduced. If the two unsynchronized shifting elements are arranged in the intermediate gear system, in particular the fitting space needed for the intermediate gear system in the radial direction is reduced.

Expediently, at least once and in particular twice in the transmission a respective shifting element is arranged on the input shaft axis and on the countershaft axis between two wheel planes, preferably with at least one shifting element and especially both shifting elements between the two wheel planes unsynchronized. If between two wheel planes there are respectively a shifting element on the input shaft axis and on the countershaft axis, the axial space occupied by the transmission as a whole can be reduced. If at the same time the shifting elements are also in the form of unsynchronized shifting elements, the radial fitting space of the transmission in the radial direction in the area of the two wheel planes can also be reduced. If such an arrangement occurs twice in the transmission, i.e. for example shifting elements are arranged between a first wheel plane and a second wheel plane respectively on the input shaft axis and on a countershaft axis, and also between the second wheel plane and a third wheel plane shifting elements are again arranged respectively on the input shaft axis and on a countershaft axis, the axial space taken up by the transmission is reduced still further.

Advantageously, at least one shifting assembly is made with two shifting elements that can be actuated by a common shifting element actuating device. In this way the axial space occupied by the transmission can be reduced and at the same time the number of shifting points is made smaller.

Expediently, at least one of the shifting elements of one of the shifting assemblies is unsynchronized. In the area of the shifting assembly concerned, the radial fitting space is also reduced thereby, at least on one side of the shifting assembly.

Advantageously, at least two and in particular at least four shifting elements are arranged symmetrically relative to one another as regards their position or location on the input axis and the countershaft axis, preferably with two of the shifting elements arranged on a common axis. Thanks to the symmetrical arrangement, the space occupied can again be reduced and the production cost for the transmission is also lower.

Further important features and advantages of the invention emerge from the subordinate claims, from the drawings and from the associated figure descriptions relating to the drawings.

It is understood that the features mentioned above and those still to be explained can be used not only in the combination indicated in each case, but also in other combinations or in isolation, without going beyond the scope of the present invention.

Preferred designs and embodiments of the invention are illustrated in the drawings and will be explained in greater detail in the description given below, wherein the same indexes refer to the same, or similar, or functionally equivalent components or elements.

DETAILED DESCRIPTION OF THE PREFERRED EMBODIMENTS

FIG. 1 shows a transmission according to a first embodiment of the present invention.

In FIG. 1, the index 1 refers to a transmission in the form of a dual clutch transmission. The dual clutch transmission 1 comprises two powershift elements in the form of two clutches K1, K2. Thus, by means of the dual clutch K1, K2 the drive input side AN can be coupled or connected to the drive output side AB of the transmission for the transmission of forces and torques. For this, the first clutch K1 is connected to a first input shaft EW1 and the second clutch K2 is connected to a second input shaft EW2. In this case the first input shaft EW1 is a solid shaft whereas in contrast the second input shaft EW2 is a hollow shaft. The two input shafts EW1, EW2 are arranged coaxially and parallel to one another.

Furthermore, the transmission 1 comprises two sub-transmissions 2, 3. The first sub-transmission 2 is coupled or can be connected to the first input shaft EW1 and the second sub-transmission 3 can be coupled or is connected to the second input shaft EW2. At least the second wheel plane II is associated with the first sub-transmission 2, while in contrast, at least the first wheel plane I is associated with the second sub-transmission 3. Beginning from the drive input side AN and starting from the two clutches K1 and K2, the transmission 1 has on the input shaft axis 4, the first wheel plane I and in addition the second wheel plane II, a first shifting element S1, a third wheel plane III, a second shifting element S2, a fourth wheel plane IV, a third shifting element S3, a fourth shifting element S4 and a reversing gear stage R. Each of the wheel planes I to IV and R has transmission elements, in particular in the form of gearwheels.

Parallel to the input shaft axis 4 is arranged a countershaft axis 5 for an intermediate gear system 6. In this case the intermediate gear system 6 comprises a first countershaft VW1, which is in the form of a solid shaft, and a second countershaft VW2, which is in the form of a hollow shaft and is coaxial with and parallel to the first countershaft VW1, radially on the outside thereof in the area of the third wheel plane III. Between the input shaft axis 4 and the countershaft axis 5 the reversing gear stage R has a reversing element in the form of an intermediate wheel ZR for reversing the rotational direction, so that by means of the drive output shaft AW and with the same rotational direction of one of the input shafts EW1, EW2 a reversed rotational direction is produced for providing at least one reversing gear in the transmission 1.

Beginning from the drive input side AN, the countershaft axis 5 first has the first wheel plane I and then the second wheel plane II, a fifth shifting element S5, the third wheel plane III, a sixth shifting element S6, the fourth wheel plane IV and the reversing gear stage R.

Below, the six shifting elements S1, S2, S3, S4. S5 and S6 and the five wheel planes I, II, III, IV and R will now be described.

The first wheel plane I is designed as a drive input constant and comprises on the input shaft axis 4, a transmission element which is connected fixed to the second input shaft EW2, and on the countershaft axis 5 a transmission element which is connected fixed to the first countershaft VW1 made as a solid shaft. The second wheel plane II comprises on the input shaft axis 4, a transmission element which is connected fixed to the first input shaft EW1, and on the countershaft axis 5 a transmission element which is designed as a loose wheel for the second countershaft VW2 and, by means of the fifth shifting element S5, can be connected thereto and hence also to the third wheel plane III. The third wheel plane III has on the input shaft axis 4, a transmission element which is a loose wheel for the drive output shaft AW and can be coupled thereto by means of the second shifting element S2, and on the countershaft axis 5 a transmission element which is connected fixed to the second countershaft VW2 made as a hollow shaft. Furthermore, the transmission element of the third wheel plane III is on the countershaft axis 5 and is designed as a loose wheel for the first countershaft VW1, since it can be coupled thereto by means of the sixth shifting element S6. The fourth wheel plane IV has on the input shaft axis 4, a transmission element which is a loose wheel for the drive output shaft AW and can be coupled thereto by means of the third shifting element S3, and on the countershaft axis 5, a transmission element which is a fixed wheel on the first countershaft VW1. The reversing gear stage R comprises a transmission element on the input shaft axis 4, which is a loose wheel for the drive output shaft AW and can be coupled thereto by means of the fourth shifting element S4. On the countershaft axis 5 the reversing gear stage R has a transmission element which is a fixed wheel on the first countershaft VW1. In addition the reversing gear stage R comprises an intermediate wheel ZR for reversing the rotational direction, as described above.

When actuated, the first shifting element S1 on the input shaft axis 4 enables the first input shaft EW1 to be coupled to the drive output shaft AW. When actuated, the second shifting element S2 on the input shaft axis 4 enables the third wheel plane III to be coupled to the drive output shaft AW. When actuated, the third shifting element S3 on the input shaft axis 4 couples the fourth wheel plane IV to the drive output shaft AW. When actuated, the fourth shifting element S4 on the input shaft axis 4 couples the reversing gear stage R to the drive output shaft AW. When actuated, the fifth shifting element S5 on the countershaft axis 5 enables the second wheel plane II and the third wheel plane III to be coupled by way of the second countershaft VW2. When actuated, the sixth shifting element S6 on the countershaft axis 5 couples the third wheel plane III to the first countershaft VW1.

The first shifting element S1, the second shifting element S2, the fifth shifting element S5 and the sixth shifting element S6 are in the form of single shifting elements. The third shifting element S3 and the fourth shifting element S4 are combined together in a shifting assembly and can be actuated by means of a single shifting element actuating device.

Furthermore, the first shifting element S1, the second shifting element S2 and the fourth shifting element S4 are unsynchronized shifting elements, while in contrast the third shifting element S3, the fifth shifting element S5 and the sixth shifting element S6 are synchronized shifting elements. In particular, the unsynchronized shifting elements S1, S2 and S4 can be made as claw clutches.

Below, the actuation of the respective clutches or shifting elements in general terms during a gearshift will now be described. For that, by means of a brief, regulated engagement of one of the two clutches K1 or K2 a respective rotational speed of transmission elements in the passive power branch of the transmission 1—the active power branch is already coupled to the drive input by the respective other clutch K2 or K1—is modulated in such manner that either a synchronized shifting element, in particular in the form of a friction clutch, is assisted, or an unsynchronized shifting element, in particular a claw clutch shifting element, is brought into synchronization with the particular transmission to be coupled. In what follows this as a whole is called the first actuation strategy.

In addition, a second actuation strategy is also possible. In this case one of the synchronized shifting elements, in particular in the form of a friction clutch, is used by virtue of a brief, regulated engagement to bring another, unsynchronized shifting element, in particular in the form of a claw clutch shifting element, into synchronization with the particular transmission element to be coupled. In what follows this is called the second actuation strategy.

As described, the transmission 1 according to FIG. 1 comprises a total of six shifting elements, of which the first shifting element S1, the second shifting element S2 and the fourth shifting element S4 are unsynchronized shifting elements, in particular claw clutches. In the transmission 1 according to FIG. 1 all shifts or gear changes can be carried out by shifting in accordance with the first actuation strategy. When shifting from the fifth forward gear to the fourth forward gear, however, in the transmission 1 according to FIG. 1 the second actuation strategy has to be used: the transmission element in the form of a loose wheel of the third wheel plane III on the input shaft axis 4 first has to be brought into synchronization with the corresponding second shifting element S2 for coupling to the drive output shaft AW. For this, the synchronized sixth shifting element S6 on the countershaft axis 5 first has to be closed so that the second countershaft VW2 is coupled to the first countershaft VW1. Thereafter, by means of a brief, regulated engagement of the synchronized third shifting element S3 the third wheel plane III is brought to the correct rotational speed to enable the unsynchronized second shifting element S2 to be shifted with no rotational speed difference.

Moreover, in the transmission 1 according to FIG. 1, depending on the prevailing rotational speed situations in the transmission 1 and the efficiency of the synchronized shifting elements during the shifts in which the first actuation strategy is applied, the second actuation strategy can also be used in whole or in part.

FIG. 2 shows a transmission according to a second embodiment of the present invention.

In FIG. 2 the index 1 refers to a transmission in the form of a dual clutch transmission. The dual clutch transmission 1 comprises two powershift elements in the form of two clutches K1, K2. Thus, by means of the dual clutch K1, K2 the drive input side AN can be coupled or connected to the drive output side AB of the transmission 1 for the transmission of forces and torques. For this, the first clutch K1 is connected to a first input shaft EW1 and the second clutch K2 is connected to a second input shaft EW2. In this case the first input shaft EW1 is a solid shaft whereas in contrast the second input shaft EW2 is a hollow shaft. The two input shafts EW1, EW2 are arranged coaxially with and parallel to one another.

In addition the transmission 1 comprises two sub-transmissions 2, 3. The first sub-transmission 2 can be coupled or connected to the first input shaft EW1 and the second sub-transmission 3 can be coupled or connected to the second input shaft EW2. Thus, at least the second wheel plane II is associated with the first sub-transmission 2 and at least the first wheel plane I is associated with the second sub-transmission 3. Beginning from the drive input side AN and starting from the two clutches K1 and K2, the transmission 1 has on the input shaft axis 4 first the first wheel plane I and in addition the second wheel plane II, a first shifting element S1, a third wheel plane III, a fourth wheel plane IV, a third shifting element S3, a second shifting element S2 and a reversing gear stage R. Each of the wheel planes I to IV and R comprises transmission elements, in particular in the form of gearwheels.

Parallel to the input shaft axis 4 is arranged a countershaft axis 5. The intermediate gear system 6 comprises a first countershaft VW1 in the form of a solid shaft and a second countershaft VW2 and a third countershaft VW3, each of these made as a hollow shaft and therefore arranged coaxially with and parallel to the first countershaft VW1, radially on the outside thereof in the area of the second wheel plane II and the third wheel plane III. Between the input shaft axis 4 and the countershaft axis 5 the reversing gear stage R has a reversing element in the form of an intermediate wheel ZR for reversing the rotational direction, so that by means of the drive output shaft AW and with the same rotational direction one of the input shafts EW1, EW2 can produce a reversed rotational direction in order to provide at least one reversing gear of the transmission 1.

Beginning from the drive input side AN, the countershaft axis 5 first has the first wheel plane I and then a fourth shifting element S4, the second wheel plane II, a fifth shifting element S5, the third wheel plane III, a sixth shifting element S6, the fourth wheel plane IV and the reversing gear stage R.

Below, the six shifting elements S1, S2, S3, S4, S5 and S6 and the five wheel planes I, II, III, IV and R will now be described.

The first wheel plane I is designed as a drive input constant and has on the input shaft axis 4 a transmission element which is connected fixed to the second input shaft EW2, and on the countershaft axis 5 a transmission element which is connected fixed to the first countershaft VW1 made as a solid shaft. The second wheel plane II has on the input shaft axis 4 a transmission element on the first input shaft EW1, which is connected fixed thereto, and on the countershaft axis 5 a transmission element which is arranged on and connected fixed to the second countershaft VW2 made as a hollow shaft. The third wheel plane III has on the input shaft axis 4 a transmission element which is connected fixed to the drive output shaft AW, and on the countershaft axis 5 a transmission element which is connected fixed to the third countershaft VW3 made as a hollow shaft. The fourth wheel plane IV has on the input shaft axis 4 a transmission element which is a loose wheel for the drive output shaft AW and can be coupled thereto by means of the third shifting element S3, and on the countershaft axis 5 a transmission element which is connected fixed to the first countershaft VW1. The reversing gear stage R has on the input shaft axis 4 a transmission element which is a loose wheel for the drive output shaft AW and can be coupled thereto by means of the second shifting element S2, and on the countershaft axis 5 a transmission element which is connected fixed to the first countershaft VW1. As described above, between the input shaft axis 4 and the countershaft axis 5 the reversing gear stage R has an intermediate wheel ZR for reversing the rotational direction.

When actuated, the first shifting element S1 couples the first input shaft EW1 to the drive output shaft AW. When actuated, the second shifting element S2 couples the reversing gear stage R to the drive output shaft AW. When actuated, the third shifting element S3 on the input shaft axis 4 couples the fourth wheel plane IV to the drive output shaft AW. When actuated, the fourth shifting element S4 on the countershaft axis 5 couples the second wheel plane II to the first countershaft VW1. When actuated, the fifth shifting element S5 on the countershaft axis 5 couples the second countershaft VW2 and the third countershaft VW3, and hence also the second wheel plane II and the third wheel plane III. When actuated, the sixth shifting element S6 on the countershaft axis 5 couples the third wheel plane III to the first countershaft VW1.

The second shifting element S2 and the third shifting element S3 are combined in a shifting assembly and can be actuated by means of a common shifting element actuating device. Furthermore, the first shifting element S1, the second shifting element S2, the fifth shifting element S5 and the sixth shifting element S6 are unsynchronized shifting elements, in particular in the form of claw clutches.

As also in the transmission 1 according to FIG. 1, in the transmission 1 according to FIG. 2 almost all the shifts can be carried out by shifting in accordance with the first actuation strategy described earlier. As also in the transmission 1 according to FIG. 1, in the transmission 1 according to FIG. 2, when shifting from the fifth gear to the fourth gear the second actuation strategy must be used. For this, the sixth shifting element S6 must be brought into synchronization with the transmission element which is a loose wheel for the first countershaft VW1, i.e. the transmission element of the third wheel plane III on the third countershaft VW3. For that, by virtue of a brief, regulated actuation of the synchronized third shifting element S3 the first countershaft VW1 is brought to the correct rotational speed so that the sixth shifting element S6 can be shifted with no rotational speed difference. When shifting from the fourth gear to the third gear, again the second actuation strategy has to be used: the fifth shifting element S5 has to be brought into synchronization with the third countershaft VW3 and the transmission element which is a loose wheel of the third wheel plane III for the first countershaft VW1. For this, the synchronized fourth shifting element S4 is briefly actuated in a regulated manner so that the second countershaft VW2 is brought to the correct rotational speed for the fifth shifting element S5 to be able to be shifted without any rotational speed difference.

Here too, in shifts for the gear change in which the first actuation strategy is used, the second actuation strategy can also be use wholly or in part.

In all, the transmission 1 according to FIGS. 1 and 2 comprises five wheel planes I, II, III, IV and R. All the wheel planes I to IV and R are in particular in the form of spur gear stages with discrete gear ratios. In each of the wheel planes I to IV and R there are two transmission elements, in particular in the form of gearwheels. The reversing gear stage R comprises an additional transmission element in the form of an intermediate wheel ZR between the input shaft axis 4 and the countershaft axis 5. Thus, there are a total of eleven transmission elements, in particular in the form of gearwheels.

In summary, the present invention provides the advantage that no central synchronization has to be used. A further advantage is that the number of individual synchronizers is reduced to a minimum. Accordingly the structure of the transmission is less complex and therefore cheaper and more compact. Another advantage is that the rotational speed equalization of the shifting elements is carried out either by means of the passive engine-side clutch or by means of one of the remaining individual synchronizers.

Although the present invention has been described with reference to preferred example embodiments, it is not limited to them but can be modified in many ways.

INDEXES

1 Transmission
2 First sub-transmission
3 Second sub-transmission
4 Input shaft axis
5 Countershaft axis
6 Intermediate gear system
I, II, III, IV, R Wheel plane
AW Drive output shaft
K1, K2 First/second powershift element
S1, S2, S3, S4, S5, S6 Shifting element
VW1, VW2, VW3 Countershaft
ZR Intermediate wheel
AN Drive input side
AB Drive output side

The invention claimed is:

1. A transmission for a motor vehicle, the transmission comprising at least two sub-transmissions, each of the at least two sub-transmissions having at least one input shaft and an output shaft being arranged as a drive output shaft of both the at least two sub-transmissions, the input shafts being arranged on an input shaft axis and the drive output shaft being arranged either on the input shaft axis or on a countershaft axis that is parallel to the input shaft axis, and an intermediate gear system having at least one countershaft, the at least one countershaft being arranged on the countershaft axis, at least four shifting elements being provided, at least two of the shifting elements being arranged on the input shaft axis and at least two of the shifting elements being arranged on the countershaft axis, and one of the input shafts being connectable to the drive output shaft by way of at least one of at least two wheel planes and at least one of the shifting elements, at least two of the at least four shifting elements are unsynchronized shifting elements and at least two of the at least four shifting elements are synchronized shifting elements, and at least one of each of the synchronized and the unsynchronized shifting elements is arranged on the input shaft axis, and half of a total number of the shifting elements are the unsynchronized shifting elements and the other half of the total number of the shifting elements are the synchronized shifting elements.

2. The transmission according to claim 1, wherein a majority of the unsynchronized shifting elements are arranged on the input shaft axis.

3. The transmission according to claim 1, wherein the transmission has at least five wheel planes, and at least one of the at least five wheel planes is a reversing gear stage, one of the synchronized shifting elements and one of the unsynchronized shifting elements are arranged axially between and adjacent to first and second wheel planes of the at least five wheel planes.

4. The transmission according to claim 1, wherein all of the unsynchronized shifting elements are arranged on the input shaft axis.

5. The transmission according to claim 1, wherein the at least one unsynchronized shifting element arranged on the input shaft axis actuates a reversing gear stage.

6. The transmission according to claim 1, wherein the transmission comprises five wheel planes that are sequentially arranged starting from an input side of the transmission in an order of a first wheel plane, a second wheel plane, a third wheel plane, a fourth wheel plane and a fifth wheel plane, and the fifth wheel plane is a reversing gear stage, and one of each of the synchronized and the unsynchronized shifting elements on the input shaft axis are arranged between the fourth wheel plane and the reversing gear stage.

7. The transmission according to claim 1, wherein the unsynchronized shifting elements are claw clutches.

8. The transmission according to claim 1, wherein a first of the input shafts and the drive output shaft are both solid shafts and are couplable via a first shifting element, and the first shifting element is one of the unsynchronized shifting elements and is aligned with a synchronized shifting element arranged on the countershaft axis.

9. The transmission according to claim 1, wherein at least two of the at least four shifting elements with regard to at least one of their position and location on the input shaft axis and the countershaft axis, are arranged symmetrically relative to one another, and two of the shifting elements are arranged on a common axis.

10. The transmission according to claim 1, wherein the transmission is shiftable between two gears by a method of briefly actuating one of two clutches to adapt a rotational speed of a shaft of a respectively passive power branch of the transmission, an active power branch which, to obtain one of the two gears, is connected with a drive input by way of one of the two clutches and the passive power branch which is not acted upon by force and torque from the drive input, in such manner that either:
- one of the at least two synchronized shifting elements, in the form of a friction clutch, is assisted, or
- a loose wheel of one of the at least two unsynchronized shifting elements, in the form of a claw clutch, is brought essentially to a same rotational speed as a transmission element to be coupled, such that the unsynchronized shifting element is shiftable essentially with no rotational speed difference during the shift between the two gears.

11. The transmission according to claim 1, wherein the double clutch transmission is incorporated in to the motor vehicle.

12. The transmission according to claim 1, wherein gears of the transmission are changable by actuating a first of the synchronized shifting elements to at least substantially equilibrate a rotational speed of a loose wheel of a first one of the unsynchronized shifting elements and a rotational speed of a transmission element to be coupled thereto, such that the first one of the unsynchronized shifting elements is shifted at least substantially free of a rotational speed difference during the change between the gears.

13. A transmission for a motor vehicle, the transmission comprising at least two sub-transmissions, each of the at least two sub-transmissions having at least one input shaft and an output shaft being arranged as a drive output shaft of both the at least two sub-transmissions, the input shafts being arranged on an input shaft axis and the drive output shaft being arranged either on the input shaft axis or on a countershaft axis that is parallel to the input shaft axis, and an intermediate gear system having at least one countershaft, the at least one countershaft being arranged on the countershaft axis, and at least four shifting elements being provided, at least two of the shifting elements being arranged on the input shaft axis and at least two of the shifting elements being arranged on the countershaft axis, and one of the input shafts being connectable to the drive output shaft by way of at least one of at least two wheel planes and at least one of the shifting elements at least two of the at least four shifting elements are unsynchronized shifting elements and at least two of the at least four shifting elements are synchronized shifting elements, and at least one of each of the synchronized and the unsynchronized shifting elements is arranged on the input shaft axis, and
one of the synchronized shifting elements and one of the unsynchronized shifting elements are combined to form a shifting assembly which is actuated by a common shifting element actuating device.

14. The transmission according to claim 13, wherein the synchronized and the unsynchronized shifting elements of the shifting assembly are arranged on the input shaft axis.

15. A dual clutch transmission for a motor vehicle, the dual clutch transmission comprising:
first and second sub-transmissions, the first sub-transmission having an input shaft and the second sub-transmission having an input shaft, and the input shafts of the first and the second sub-transmissions being coaxially aligned along an input shaft axis;
a drive output shaft being drivably connectable to the first and the second sub-transmissions and forming a transmission drive output, the drive output shaft being axially aligned along the input shaft axis;
an intermediate gear system comprising at least one countershaft being aligned along a countershaft axis extending parallel to the input shaft axis;
first, second, third, fourth, fifth and sixth shifting elements, the first, the second and the third shifting elements being arranged along the input shaft axis and the fifth and the sixth shifting elements being arranged along the countershaft axis;
first, second, third, fourth and fifth wheel planes being selectively engagable to connect to the input shafts of the first and the second sub-transmissions to the drive output shaft and obtain a plurality of gear ratios;
one of the input shafts of the first and the second sub-transmissions being connectable to the drive output shaft via at least one of:
engagement of at least two of the first, the second, the third, the fourth and the fifth wheel planes, and
engagement of at least one of the first, the second, the third, the fourth, the fifth and the sixth shifting elements;
the first, the second, the third and the fourth shifting elements being aligned along the input shaft axis, and the first, the second and the fourth shifting elements being unsynchronized shifting elements and the third shifting element being a synchronized shifting element;
the fifth and the sixth shifting elements being aligned along the countershaft shaft axis, and the fifth and the sixth shifting elements being synchronized shifting elements; and
the third and the fourth shifting elements form a shifting assembly and are actuated by a common shifting element actuating device.

* * * * *